United States Patent [19]
Pall et al.

[11] Patent Number: 5,143,616
[45] Date of Patent: Sep. 1, 1992

[54] COMPOSITE STRUCTURE AND METHOD OF MAKING

[75] Inventors: David B. Pall, Roslyn Estates; Stephen A. Geibel, Cortland, both of N.Y.

[73] Assignee: Pall Corporation, Glen Cove, N.Y.

[21] Appl. No.: 700,268

[22] Filed: May 15, 1991

[51] Int. Cl.$^5$ .................. B01D 67/00; B01D 71/56; B01D 71/68

[52] U.S. Cl. .................. 210/500.38; 210/500.41; 210/500.42; 264/45.1; 264/DIG. 48; 264/DIG. 12

[58] Field of Search ............ 210/500.21, 500.27, 210/500.38, 500.41, 500.42, 500.36; 264/45.1, DIG. 48, DIG. 62

[56] References Cited

U.S. PATENT DOCUMENTS

| | | |
|---|---|---|
| 3,544,358 | 12/1970 | Manjikian . |
| 3,563,889 | 2/1971 | Cooper, IV et al. . |
| 3,592,763 | 7/1971 | Tulin . |
| 3,676,193 | 7/1972 | Cooper, IV et al. . |
| 3,762,566 | 10/1973 | Del Pico . |
| 3,853,757 | 12/1974 | Pages . |
| 3,904,788 | 9/1975 | Blaha . |
| 3,950,255 | 4/1976 | Ishii et al. . |
| 4,203,847 | 5/1980 | Grandine, 2nd . |
| 4,203,848 | 5/4980 | Grandine, II . |
| 4,340,479 | 7/1982 | Pall . |
| 4,340,480 | 7/1982 | Pall et al. . |
| 4,454,176 | 6/1984 | Buckfelder et al. . |
| 4,501,663 | 2/1985 | Merrill . |
| 4,645,602 | 2/1987 | Barnes, Jr. et al. . |
| 4,702,947 | 10/1987 | Pall et al. . |
| 4,915,839 | 4/1990 | Marinaccio et al. . |

Primary Examiner—Frank Sever
Attorney, Agent, or Firm—Leydig, Voit & Mayer

[57] ABSTRACT

A composite structure, particularly a filter structure, is provided comprising a support having a surface and a porous membrane formed integrally to the surface of the support. The support preferably includes means for directing a fluid away from the surface of the support. The support surface is at least slightly soluble in a solvent. The porous membrane comprises a resin soluble in the solvent and precipitated while the casting solution is in contact with a porous substrate and the surface of the support. The membrane is formed and integrally secured to the surface of the support contemporaneously.

53 Claims, 2 Drawing Sheets

COMPOSITE STRUCTURE AND METHOD OF MAKING

FIELD OF THE INVENTION

This invention relates to composite structures and to methods of making them. More specifically, the invention relates to filter structures comprising a porous membrane integrally secured to a support and useful in a wide variety of fluid filtration or separation processes.

BACKGROUND OF THE INVENTION

Many conventional filter structures include a porous membrane as the filter medium, combined with nonporous structural components, in order to obtain a filtering element sufficiently rugged to withstand high differential pressure caused by flow of fluid in one direction; however, such structures are poorly suited to conditions of bidirectional flow. Bidirectional flow is often necessary, for example, to remove collected solids from the surface of the filter.

To provide the requisite strength for bidirectional flow, the filter structure may include a stronger support structure to which the membrane is physically attached or bonded, e.g., a support structure such as a core in a cylindrical filter element. This support structure should preferably not interfere with the filtering functions of the membrane while lending the membrane requisite support.

Filter structures of this general type have several drawbacks. For example, cylindrical filter elements with the filtration membrane mounted on the exterior of a grooved and/or perforated cylindrical core support function effectively provided flow is from the outside to the inside. However, if reverse flow occurs from inside to outside, as often happens in practice, the membrane is prone to rupture with catastrophic results. For example, a typical 0.15 centimeter (cm) thick membrane wrapped and edge sealed about a cylindrical support core 7.5 cm in diameter and exposed to a relatively low reverse differential pressure of 0.7 kilograms per square centimeter (or 10 pounds per square inch, or psi) experiences a stress of about 170 kilograms per square centimeter (or about 2,500 psi), which would cause even the most rugged membrane to fail. Similarly, if the cylindrical filter element or structure is rapidly rotated about its longitudinal axis with concomitant high centrifugal forces, the membrane may rupture.

Various techniques have been developed in an attempt to overcome these types of problems; attaching the membrane to the support by melt bonding is one approach. However, the cost of labor to perform the necessary procedure is, for many purposes, excessive, and most or all such procedures prevent flow through the attached areas. Furthermore, the necessity for the core support to be formed of low melting plastic, when melt bonding is used to secure the membrane, limits the useful temperature range of such filters. Another disadvantage is the use of different kinds of resin for the membrane and the support, each with its own vulnerability to chemical attack, thereby limiting the range of applications compared with that of structures in which the support and the microporous structure are both formed of the same resin, for example, if both are the same polyamide. The problem is exacerbated if an adhesive of still another composition is used to secure the membrane to the support.

Additional problems may arise with systems using an adhesive. If too little of the adhesive or solvent is added, the membrane is only weakly bonded to the support structure. If too much adhesive or solvent is applied, the membrane may be blinded by the excess adhesive or solvent, decreasing the filtering capacity of the membrane. Even if a very thin coat of adhesive is applied, essentially all of the adhesive tends to be absorbed into the pores of the membrane, causing weak or zero bonding. It is also possible that the fluid being filtered is incompatible with the adhesive or that the adhesive will leach into the fluid being filtered and contaminate it.

DEFINITION OF TERMS

The term "membrane" as used hereinafter refers to a porous polymeric structure, generally formed from a polymeric resin, that serves as the filter medium in the subject invention. Typically, the membrane will have a pore rating at the upper end of about 20 micrometers, and at the lower end can be in the ultrafiltration range, wherein dissolved substances of molecular weight from about 5,000 to 5,000,000 Daltons are removed, a preferred range being from about 10 micrometers at the upper end down to at the lower end a pore rating which will remove dissolved substances of molecular weight of about 10,000 Daltons. In the microporous range, a pore rating ranging from about 10 to about 0.02 micrometers is preferred. The polymeric resin is dissolved in a solvent to form a casting solution which is used to impregnate a substrate (defined below) followed by precipitation of the resin to form the membrane.

The term "substrate" refers to a macroporous material, typically a woven or non-woven fibrous sheet, which is impregnated with or saturated by the casting solution and serves as a carrier for the casting solution from which the membrane of the invention is ultimately formed by precipitation within and about the substrate of the polymeric resin in the casting solution. The material of which the substrate is composed is preferred to be resistant to attack or dissolution by the solvent. As described in more detail below, the substrate is impregnated or saturated with the resin-containing casting solution, the so-impregnated substrate is contacted with a support (as that term is defined below), and the resin is precipitated to form the membrane with the substrate forming an integral part of the membrane by virtue of the precipitation of the polymeric resin in and about the substrate.

The term "support" refers to a structural member to which the membrane and the substrate are secured (by the methods described below) and which provides support for and defines the configuration of the membrane, thus contributing to maintaining the integrity of the membrane and to overcoming the drawbacks discussed above. The support may, and preferably does, include means for directing a fluid away from the surface of the support, e.g., via grooves or channels. The support may be flexible, semi-flexible, or rigid; for example, it may comprise a woven mesh comprising polyamide filaments or filaments of other suitable resins. Depending on its filament size, the support can range from easily flexed to quite rigid. The support may comprise filaments formed into a netting by extrusion of hot plastic to form the filaments of the netting and to bond them together during or subsequent to extrusion in order to make a perforate support in the form of, for example, a perforate sheet or a seamless perforate cylinder. Such nettings may be made by passing the molten or softened resin through a set of counter-rotating extrusion dies to form a continuous tube of the netting, which is thereafter cut to the desired length, or slit axially to form one or more sheets of netting. The saturated substrate may be applied to any of the above-descried woven meshes or applied to extruded or otherwise formed nettings by placing strips or sheets of saturated substrate in contact with one or both surfaces while the mesh or netting is flat. Alternatively, the saturated substrate may be placed while the netting or mesh has been formed to tubular or other curved form, for example, by wrapping the netting around a cylindrical mandrel from which it may later be removed, forming a filter cylinder comprising a membrane, a substrate, and a support.

DISCLOSURE OF THE INVENTION

An object of the present invention is to overcome the drawbacks described above.

According to one aspect of the invention, a composite structure is provided comprising a membrane formed integrally to a support. The support also includes a surface which is at least slightly soluble in a solvent. The support also preferably includes structure which permits fluid to flow away from the surface. For example, the support may include one or more channels or openings in the surface or a porous region of the surface through which fluid can drain away from the surface. The membrane comprises a resin or mixture of resins that is soluble in the solvent. The membrane is formed integrally to the surface of the support by precipitating the resin while the casting solution is in contact with a substrate and the surface of the support.

According to another aspect of the invention, a method of making a composite structure, particularly a filter structure, may comprise the steps of positioning a substrate impregnated with a casting solution on a surface of a support, at least slightly dissolving the surface of the support by means of a solvent, and then forming a membrane integrally to the surface of the support by precipitating the resin from the casting solution while the solution is in contact with the substrate and the surface of the support.

Thus, according to various aspects of the invention, the membrane is formed integrally to the support. In other words, in a single step the membrane is secured directly to the surface of the support as the membrane is being formed. When the casting solution containing the resin and the solvent contacts the support, the solvent at least slightly dissolves the surface of the support. As the solvent is then extracted or otherwise removed from the casting solution and the resin begins precipitating, the precipitating resin begins forming the porous membrane, and at the same time the dissolved surface of the support begins reforming. At the interface between the reforming surface of the support and the forming membrane, the surface and the membrane are tightly and integrally secured to one another.

Embodiments of the invention represent a considerable advance in the state of the art. As previously indicated, filter elements or structures were conventionally manufactured by first forming a porous, polymeric membrane and then, in a separate step, attempting to physically attach or bond the membrane to a support. Compared to the method of making a filter structure or element according to the present invention, this conventional process can be considerably more expensive and time consuming due to the separate steps of first forming and then bonding or attaching the membrane to the support. In addition, filter structures embodying the present invention withstand much higher differential pressures during service and are far more reliable and effective than conventional filter elements. For example, in a filter structure embodying the present invention there is virtually no risk that the membrane will be torn because the membrane is secured directly to the support as the membrane is being formed. Further, there are no adhesives or solvents added between the membrane and the support. Consequently, there is no risk that the membrane will be blinded or that the fluid being filtered will be contaminated. Further, the drainage channels can be quite narrow such that the membrane which is integrally attached on each side of each channel can withstand high pressure drop during liquid flow in both directions. The membrane thus survives, without damage, flow conditions which would destroy the integrity of a conventionally bonded, otherwise similar assembly.

DETAILED DESCRIPTION OF EMBODIMENTS

In order to better explain the manner of preparing filter structures in accordance with this invention, it will be helpful to set out the procedure by which preferred types of membranes useful in the invention are prepared.

MANUFACTURE OF POLYAMIDE MEMBRANES

U.S. Pat. No. 4,340,479, which is incorporated herein by reference, described, inter alia, a procedure whereby microporous polyamide membranes can be made by procedures which use the steps of:

(a) dissolving the polyamide resin in a mixture of formic acid and water;

(b) diluting the so-formed solution with additional water or with a mixture of water and formic acid under closely controlled conditions described in the patent in order to form a "casting resin solution";

(c) immersing into the casting resin solution a substrate;

(d) removing the substrate, now saturated with casting resin solution, while using means, such as doctor blades, to leave a thin excess of the casting resin solution on one or both sides of the macroporous web; and then (e) immersing the so-saturated substrate into a relatively more dilute solution of formic acid and water, the concentration being such that the polyamide resin is not soluble therein, thereby precipitating the polyamide resin to form a membrane in which the fibers or other solid parts of the substrate form a matrix with is filled from one face to the other with precipitated resin; the resulting membrane product after washing and drying is useful as a filter medium and currently enjoys extensive industrial use.

CYLINDRICAL POLYAMIDE MEMBRANE FILTERS

Figure 1:
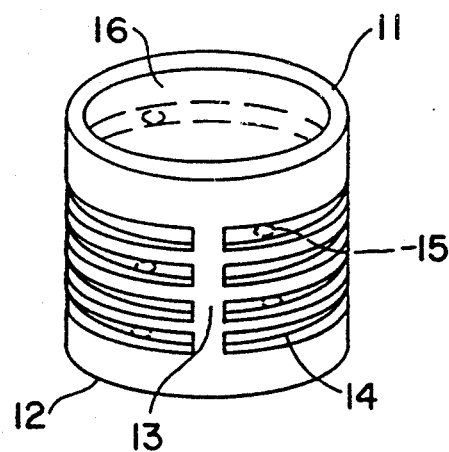
FIG. 1 shows a cylindrically shaped filter core for use as a support for a filter structure of a type previously used.

In one application of membranes, such as those produced by the procedure described above, the dry membrane is applied as an external wrap to the surface of a cylindrically-shaped filter core, the core being made of a plastic of lower melting point compared with that of the components of the polyamide membrane. The core is shaped on its external surfaces in the manner shown in FIG. 1 with a circular surface at each of the ends 11 and 12 and a strip forming a single longitudinally disposed ridge 13. Interspersed between ends 11 and 12 and strip 13 are a series of grooves 14, each groove being pierced with at least one hole 15 communicating with the internal diameter of the core 16. The polyamide membrane, cut to a length equal to the length of the core and to a width about 2 to 4 millimeters larger than the circumference of the core and then wrapped around the cylinder, disposed such that the 2 to 4 millimeters overlap at the ends, is located directly over the ridge 13. The membrane is next attached to the core along the ridge 13 by contacting the overlap area on the ridge 13 to a hot metal surface, preferably with a thin sheet of Teflon-impregnated glass cloth interposed, causing the lower melting resin of the core to soften and permeate the micropores of the membrane, thereby forming a firm bond between the core and the two membrane layers. Each end of the cylinder is then similarly bonded to the core by the application of appropriately shaped hot surfaces, forming a seal at both ends.

Such cylinders are useful for filtration provided that flow is always from outside to inside. However, they suffer from the drawbacks described above. Specifically, as discussed above, if reverse flow occurs from inside to outside, as it often does in practice in order, for example, to backwash the filter, thereby flushing out part or all of the collected solids, or if the cylinder is rotated about its axis in a manner such as to develop high centrifugal forces, the membrane is prone to rupture, particularly if the filter diameter is relatively large. Such filters are, for these reasons, of limited usefulness. A further disadvantage is that the cost of labor to perform the necessary welding is, for many purposes, excessive. Furthermore, the necessity for the core to be formed of low melting plastic limits the useful temperature range of such filters. Another disadvantage is the use of different kinds of resin, each with its own vulnerability to chemical attack, thereby limiting the range of applications compared with that of structures in which the core and the microporous structure are both formed of the same resin, for example, if both are the same polyamide.

TARGET CHARACTERISTICS OF THE FILTERS OF THIS INVENTION

In order to overcome the above-described deficiencies, the filters of this invention preferably comprise a membrane, a substrate, and a support. A commonly desired form comprises a cylindrical support, referred to hereinafter as a core, the end product also being a cylinder. The support may also or alternately have a plane surface and be generally flat in form, for example, a square or a disc, in which the lateral dimensions generally exceed the thickness. The chemical composition of the membrane and the support is generally identical or very similar such as to have identical or nearly identical characteristics with respect to resistance to, for example, heat and a variety of chemicals. Furthermore, the filters of the invention are mechanically superior because they withstand relatively high differential pressures encountered during inside to outside flow and because they withstand exposure to high centrifugal forces. Further, the preferred filters in accordance with the invention are highly reliable because they preferably comprise more than one layer of the membrane and, for this reason, the probability of a through pinhole, such as might exist with a single layer, is reduced to virtually zero.

These favorable characteristics are for example obtained in the preferred filters of this invention by utilizing a double layer of the membrane integrally secured to a support or a core comprising preferably narrow, closely spaced drainage grooves at every point at which they are in contact such that the core or support and the filter medium are under working conditions essentially inseparable.

MANUFACTURE OF THE IN INTEGRALLY BONDED FILTERS

Figure 2:
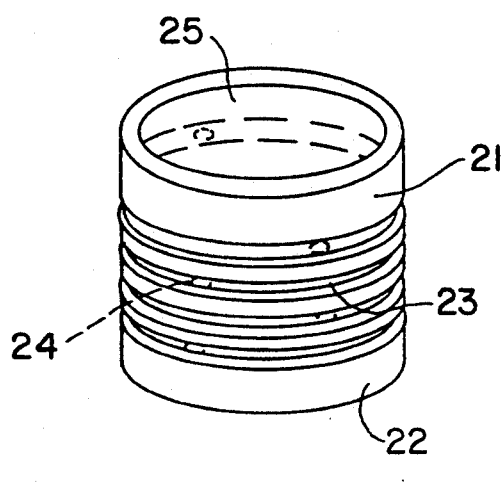
FIG. 2 shows another cylindrically shaped filter core suitable for use as a support for a filter structure embodying the present invention.

A cylindrical filter having a preferred form of this invention may be made by the following procedure:

1. a ribbon comprised of a macroporous web or substrate saturated with a casting resin solution is prepared in accordance with steps (a) through (d) of the preceding section entitled "Manufacture of Polyamide Membranes", the ribbon width preferably being between about 0.1 and about 10 times the diameter of the support or core described below;

2. a cylindrically-shaped core or support is provided having the configuration of the core shown in FIG. 2 where the two ends are circular surfaces 21 and 22 between which are located grooves 23, the outer diameter between these grooves being substantially the same as that of the circular surfaces 21 and 22 and each groove having been pierced by at least one hole 24, thereby communicating with the internal diameter 25;

3. the saturated ribbon is wound about the core at an angle such that each layer of ribbon overlaps the one preceding it; in a preferred configuration, each succeeding layer covers one-half of the preceding layer such that, on completion, a double layer of ribbon has been placed on the core;

4. the so-formed wet tube may be allowed to stand, usually enclosed so as to minimize evaporation of solvent, for a sufficient time to permit a slight dissolution of the outer skin of the portion of the core in contact with the ribbon and the casting resin solution; and 5. the tubular assembly is then immersed into a bath of composition to cause the dissolved resin to precipitate as a porous filter structure or membrane within the ribbon and at the surface of the core, in the process of which the ribbon, the membrane, and the core or support are all bonded together; this step is generally complete within about 10 to 200 seconds, after which the assembly is washed free of solvent and then dried.

Figure 3:
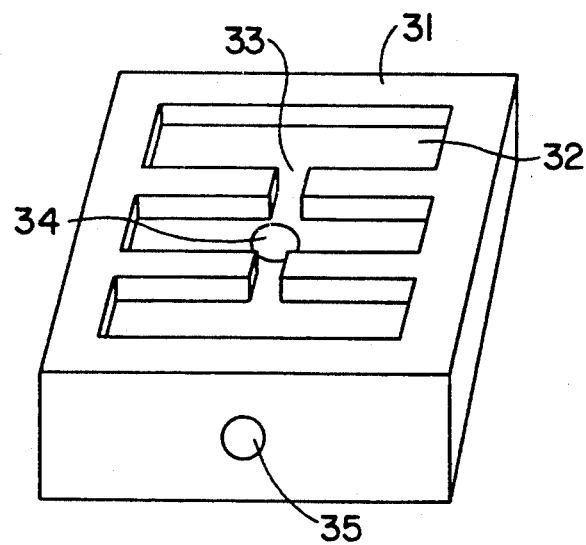
FIG. 3 shows a flat support to which a membrane of this invention may be attached.

A filter comprising a plane surface may be made by the following procedure:

1. a sheet which is as wide or wider than the plane surface of the support is made comprising a substrate saturated with a casting resin solution prepared in accordance with steps (a) through (d) of the preceding section entitled "Manufacture of Polyamide Membranes";

2. a support of rectangular form with a plane surface is prepared having the configuration shown in FIG. 3 where the plane surface 31 is intersected by grooves 32 and by cross grooves 33; also provided is a passageway 34 which is internally connected to outlet passageway 35 in a manner such as to permit fluid to flow from passageway 34 to the outlet passageway 35;

3. the saturated sheet is laid onto surface 31 with care to avoid air inclusions and may be further intimately secured to surface 31 by a very short exposure to vacuum applied to passageway 35; and 4. the remaining steps are similar to steps 4 and 5 for cylindrical cores as described above.

Figure 4:
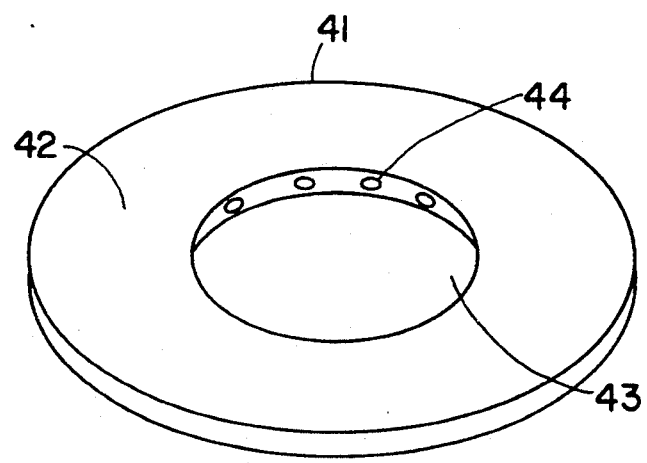
FIG. 4 shows a disc form filter.

A plane surface filter may alternatively have the form of a disc, which may be ported such as to deliver filtrate below the disc or may be shaped as a toroid as shown in FIG. 4, wherein the toroid 41 made with membrane 42 on one or both surfaces may be made with opening 43 at its center into which filtered fluid flows via internal grooves and holes 44. Such discs can be stacked with intervening separating spacers, forming an assembly of any desired effective surface area.

Filters so made tolerate high differential pressure during reverse flow of liquid or when rotated at high speed, and the thermal and chemical characteristics of the core or support are the same as or similar to those of the microporous filter medium.

A filter structure embodying the invention generally comprises a support and a membrane formed to the support. Because the filter element may be used in virtually any type of fluid filtration or separation process, the support preferably has sufficient structural integrity to support the membrane under a wide variety of process conditions, including high-shear flow at the face of the membrane, reverse flow through the membrane, and high-speed rotation of the support. Consequently, the support may be either rigid or flexible but preferably maintains its dimensions and shape when subject to applicable process conditions.

The support may be configured in a variety of shapes, depending on the applicable filtration or separation process. For example, the support may have a generally cylindrical configuration when the filter element is to be used in a dynamic filtration process employing a rotor for generating a desired flow pattern in the fluid being filtered, and the grooves which permit fluid to pass downstream of the filter may be circular, helical, or straight and parallel to the axis of the core. As another example, the support may be a flat plate or disc and may be used in processes which require the plate or disc to be stationary or to be rotated.

Regardless of the shape of the support, the support includes at least one surface on which the substrate impregnated with the casting solution can be positioned and to which the membrane can be formed. The surface may be flat or curved and may be smooth or irregular. In addition to the surface, the support generally also includes a structure for directing fluid away from the surface. This structure may comprise one or more channels or openings in the surface through which the fluid can drain away from the surface. As another example, the structure for directing fluid away from the surface may be a porous region of the support which communicates with the surface and allows fluid to drain away from the surface.

The support may be a one-piece unit fashioned from a single material of a multiple-piece assembly formed from one or several materials. In accordance with one aspect of the invention, at least a portion and preferably all of the surface of the support to which the membrane is to be formed should be at least slightly soluble in or at least softened by a solvent which is capable of dissolving the resin comprising the membrane. Consequently, the material defining the surface of the support is preferably a polymeric material. Because the surface of the support and the resin of the membrane are to be dissolved by the same solvent, the support and the resin may conveniently comprise the same polymeric material. For example, if a polyamide is selected for the membrane, then the support surface may also be fashioned from the same polyamide. Similarly, if polyvinylidene difluoride (PVDF), polyethersulfone (PES), or polysulfone (PS) is selected for the membrane, then the support surface may also be fashioned from PVDF, PES, or PS, respectively. Alternatively, the polymeric material of the support surface may be different from the resin or resins selected for the membrane as long as the solvent for the resin also at least slightly dissolves the polymeric material of the surface of the support.

Alternatively, the support (filter core) may be formed from metal, e.g., stainless steel, and then powder coated with a polyamide prior to being contacted with the impregnated substrate (casting solution wetted ribbon). As another alternative, a support (core) may be machined from a dimensionally stable polyamide, such as nylon 11, and embedded in a less dimensionally stable polyamide, such as nylon 46, 6, or 66 powder, and held at an elevated temperature for the time required to diffuse the nylon powder into the core to obtain adhesion.

The substrate which serves as the carrier for the casting solution is positioned on the surface of the support, i.e., the substrate is positioned in contact with or in close proximity to the surface of the support.

Because the substrate initially serves to hold a casting solution containing the resin and solvent in place on, i.e., in contact with, the support surface, the substrate is preferably flexible enough to conform to the surface of the support and preferably has a relatively open structure which will absorb the casting solution and maintain the solution in place regardless of the orientation of the surface. To minimize the thickness of the membrane, the porous substrate is preferably in the form of a sheet. Examples of suitable structures include a web, a netting, a mesh, a screen, or a woven or non-woven sheet formed from fibers or filaments.

The substrate is preferably fashioned from a material which is strong enough to withstand the forces associated with saturating the substrate with the casting solution and positioning the substrate on the support surface. To maintain the strength of the substrate, the substrate, itself, is preferably not affected, or only slightly affected, by the solvent in the casting solution. Further, after the membrane has been formed to the surface of the support, the substrate serves to strengthen the membrane. Consequently, the substrate is preferably fashioned from a material which is also strong enough to resist the forces associated with the applicable filtration or separation process. Examples of suitable materials include polyesters, polypropylene, polyamides, cellulose esters, woven glass fiber fabric, and similar materials.

The membrane may be of any suitable polymer that can be formed by precipitating a resin from a casting solution containing the resin and a solvent which dissolves the resin. The membrane may be skinned or skinless; it may be hydrophobic or hydrophilic; it may have pores of constant size or pores varying in size from one face to the others.

The resin comprising the membrane may be any polymeric material or mixture of polymeric materials that can dissolve in a solvent and then precipitate to form the membrane. Preferred resins include polyamides such as nylon 46, 6, 66, 7, 69, 610, 612, 11, and 12 or mixtures thereof. Other preferred resins include polyvinylidene difluoride and polysulfones, such as polyethersulfones.

The solvent of the casting solution may be any solvent capable of dissolving the resin or resins of the membrane and at least slightly dissolving the surface of the support. Solvents for polyamide resins are well known, as shown in U.S. Pat. No. 4,340,479. A preferred solvent capable of dissolving nylon is formic acid.

Solvents capable of dissolving PVDF include acetone, dimethyl acetamide, dimethyl formamide, dimethyl sulfoxide, and similar solvents.

Solvents for polysulfones, such as polyether sulfones, include dimethyl acetamide, a mixture of dimethyl acetamide and propionic acid, a mixture of n-methyl-2-pyrrolidone and propionic acid, formamide, dimethyl sulfoxide, cyclohexanone, and the like.

A method of making a filter element embodying the present invention comprises, in part, the steps of applying a casting solution to a porous substrate and positioning the porous substrate on a surface of the support. The conditions under which the casting solution is prepared and the properties of the casting solution depend principally on the type of resin and on the characteristics of the membrane which are desired and are well known for many polymeric membranes. For example, to produce a microporous, hydrophobic PVDF membrane, U.S. Pat. No. 4,203,848 describes a polymer solution comprising 15%-25% by weight of PVDF in acetone at temperatures of 50° C. or higher. To produce a skinless, hydrophilic nylon membrane, U.S. Pat. No. 4,340,479 describes a resin solution in which nylon 11 is dissolved in 98.5% formic acid to yield a 70% formic acid solution containing 20% of resin. The '479 patent further describes a casting solution formed from the resin solution by combining the resin solution with a non-solvent solution comprising a mixture of formic acid and water. Thus, as seen from these examples, the casting solution may contain only the resin and a solvent for the resin or it may contain the resin, a solvent for the resin, and additional components, such as a non-solvent for the resin.

The casting solution may be applied to the porous substrate in any suitable manner, preferably before the substrate is positioned on the support. For example, the casting solution may be spread or sprayed onto the porous substrate, or the porous substrate may be immersed in a bath of the solution, allowing the casting solution to fully impregnate the porous substrate. To ensure that the casting solution completely penetrates all of the openings of the porous substrate, the substrate may be exposed during saturation to one or more cycles of reduced pressure to extract any entrained air bubbles. The fully saturated substrate may then be passed through doctor blades or any other mechanism for trimming excess solution from the substrate and producing a thin, even coating of the casting solution on one or both sides of and embedded in the substrate.

The trimmed, saturated substrate may then be positioned on the surface of the support in a variety of ways. For example, if the support is generally cylindrical, thin strips or a large sheet of the saturated substrate may be wrapped around the surface of the cylindrical support. For a flat support, such as a plate or disc, the saturated substrate may simply be laid on the surface of the support. By positioning the substrate onto the surface of the support after the casting solution has been applied to the substrate and the amount of casting solution adjusted to the desired level, e.g., by means of doctor blades, the likelihood of the casting solution running into and clogging the channels or pores comprising the fluid directing means is greatly reduced. Instead, the casting solution is held within the openings of the trimmed, saturated substrate and in contact with the surface of the support.

A method embodying the invention also comprises the step of at least slightly dissolving the surface of the support by means of the solvent.

As soon as the solution in the saturated substrate contacts the surface of the support, the solvent in the solution begins dissolving the polymeric material comprising the surface of the support. Because the substrate is completely and evenly saturated, the entire area of the surface to which the membrane will be bonded is substantially evenly dissolved by the solvent.

A method embodying the invention further comprises the step of forming the membrane to the surface of the support by precipitating the resin within the substrate and onto the surface of the support. The resin may be precipitated from the casting solution by decreasing the concentration of the solvent in the casting solution. For example, a portion of the solvent, which may comprise a combination of two or more solvents, may be evaporated under controlled conditions. Alternatively a precipitating solution may be applied to the assembly of the support and the saturated substrate. The precipitating solution may contain both the solvent and a non-solvent for the resin. However, the concentration of the solvent in the precipitating solution is lower than the concentration of the solvent in the casting solution. As the precipitating solution is applied to the saturated substrate, non-solvent in the precipitating solution diffuses into the casting solution in the substrate while the solvent in the casting solution diffuses into the precipitating solution. Consequently, the concentration of the solvent in the casting solution decreases and the resin begins precipitating.

The precipitating solution may be applied in any suitable manner, preferably one which results in essentially simultaneous and complete exposure of all of the saturated substrate to a sufficient volume of the precipitating solution to ensure that the addition of the casting solution does not substantially alter the concentrations of the solvent and non-solvent in the precipitating solution. Thus, although the precipitating solution may be applied by spraying or flooding the saturated substrate and support, it is preferably applied by immersing the saturated substrate and support in a bath of the precipitating solution. The bath may be static or agitated.

Upon immersion of the support and saturated substrate into the precipitating solution, the resin begins precipitating and forming the porous membrane within the openings of the porous substrate and directly on the surface of the support, while at the same time the surface of the support is reforming. The properties of the precipitating solution and the appropriate conditions for forming the membrane depend, in part, on the desired resin and characteristics of the membrane. However, in accordance with the present invention, a membrane comprising any of several resins and having a wide variety of characteristics may be uniformly and tightly formed directly to the surface of a support in a single step.

Once the membrane and support have been fully formed to one another, the filter element, including the support, the substrate, and the porous membrane, may be rinsed to remove all of the solvent or any other components of the casting or precipitating solutions. The filter element may then be dried and tested.

A specific example of a filter element and of a method of making a filter element embodying the invention is illustrated by a skinless, hydrophilic nylon membrane formed integrally to the grooved surface of a cylindrical nylon support. In this example, the resin is a polyamide, nylon 66, the solvent is formic acid, and the non-solvent is a solution of formic acid in water in which the formic acid concentration is 52% by weight. The casting resin is formed by dissolving nylon 66 in 85 weight percent of formic acid in water at 30° C. to yield a casting solution containing 14.6 percent by weight of nylon 66 and passing this solution through an inline mixer, as described in the '479 patent, thereby adding sufficient water to the resin solution under intense mixing conditions to produce a casting resin solution adjusted so as to produce a membrane with an effective pore diameter of 0.2 micrometers.

A filter core is fabricated from a tube of nylon 66 resin 7.6 cm inside diameter, 8.25 cm outside diameter, and 25.4 cm long. Except for a width of 2 cm at each end, the external surface of the tube is machined to form grooves 0.076 cm wide and 0.079 cm deep on 0.127 cm centers over the 21.4 cm long central outer surface of the tube, and each groove is then perforated by a hole 0.076 cm in diameter.

The substrate is a non-woven polyester fabric having a weight of 24 grams per square meter which has been calendered to a thickness of 0.006 cm from which a strip 2.54 cm wide × 6 meters long has been cut and then wound about a reel from which it can be conveniently unwound as needed.

An apparatus is provided comprising a reel of width 2.5 cm around which the 2.5 cm wide strip of the substrate described above is wound. An open top vessel is provided in which the casting resin solution is placed, the vessel being provided with three internal idler rolls located such as to impregnate the strip of substrate as it passes from the reel through the casting resin where it passes over and under the idler rolls in a manner such as to thoroughly saturate the strip with casting resin solution. As the strip exits from the bath, it passes through a rectangular opening in a stainless steel sheet, the dimensions of the opening being 0.030 cm wide × 25.6 cm long, which serves to remove excess resin from the strip of substrate but leaves a thin film of casting resin solution on each side of the strip.

A filter core of the construction described above and shown in FIG. 2 is mounted on the spindle of a machine designed to cause the core to precess (i.e., move in a helical fashion) axially as it is rotated, the amount of precession being 1.27 cm per 360° turn of the core. The device of the preceding paragraph is located in conjunction with the core at the desired lead angle of the wound substrate strip, in this case 2.8°, whereby the 2.54 cm wide saturated strip is laid from one end of the core to the other in the form of an overlapped spiral of pitch 1.27 cm, thereby laying down a double layer of the saturated strip in close contact with the outer diameter of the core.

In the next step, the wound core is removed from the mandrel and dipped into a vessel containing a solution of 52% formic acid in water. In about 1 to 2 minutes, the membrane forms, firmly bonded to the core. In the final steps, the filter element is washed with water to free it of formic acid and then oven dried, thus completing a filter element which comprises a skinless, hydrophilic nylon 66 membrane which is formed within a polyester substrate and directly to the surface of a nylon 66 support and is illustrative of the invention.

As discussed above, polyamides other than nylon 66 can be used and a variety of other solvents may be employed including, for example, trifluoroethanol, acetic acid, phenol, and sulfuric and hydrochloric acids. Other resins may be used, for example, PVDF and polysulfones, such as polyethersulfone. All of these can be used with a variety of non-solvents.

While the invention has been described in some detail by way of illustration and example, it should be understood that the invention is susceptible to various modifications and alternative forms and is not restricted to the specific embodiments set forth herein. Rather, it is intended to cover all modifications, equivalents, and alternative falling within the spirit and scope of the invention.

We claim:

1. A composite structure comprising:
   a support including a surface which is at least slightly soluble in a solvent; and
   a substrate together with a membrane, the membrane comprising a resin soluble in the solvent and being formed and integrally secured to the surface of the support contemporaneously, the membrane bonding to the support as the membrane forms and the surface of the support reforms.

2. The composite structure of claim 1 wherein the composite structure is a filter structure and the support further comprises means for directing a fluid away from the surface of the support.

3. The filter structure of claim 2 wherein the surface of the support comprises a polymeric material.

4. The filter structure of claim 3 wherein the polymeric material comprises a polyamide.

5. The filter structure of claim 3 wherein the polymeric material comprises PVDF.

6. The filter structure of claim 3 wherein the resin and the polymeric material of the support comprise the same polymer.

7. The filter structure of claim 2 wherein the support has a generally flat configuration.

8. The filter structure of claim 2 wherein the support has a generally cylindrical configuration.

9. The filter structure of claim 2 wherein the support has a generally disc-like configuration.

10. The filter structure of claim 2 wherein the fluid directing means comprises at least one channel in the surface.

11. The filter structure of claim 2 wherein the fluid directing means comprises a porous region of the support which communicates with the surface.

12. The filter structure of claim 2 wherein the substrate comprises a fibrous sheet.

13. The porous structure of claim 12 wherein the fibrous sheet comprises polymeric fibers.

14. The filter structure of claim 13 wherein the polymeric fibers comprise polyester fibers.

15. The filter structure of claim 12 wherein the fibrous sheet comprises a non-woven web.

16. The filter structure of claim 2 wherein the resin comprises a polyamide.

17. The filter structure of claim 16 wherein the resin comprises nylon 46, 6, 66, 7, 69, 610, 612, 11, 12, or mixtures thereof.

18. The filter structure of claim 2 wherein the resin comprises polyvinylidene fluoride.

19. The filter structure of claim 2 wherein the resin comprises polyether sulfone.

20. The filter structure of claim 2 wherein the membrane is microporous.

21. The filter structure of claim 2 wherein the porosity of the membrane is in the ultrafiltration range and the membrane has the capability of retaining from solution molecules of molecular weight in the range from about 5000 to about 5 million Daltons.

22. The filter structure of claim 2 wherein the membrane is skinless.

23. The filter structure of claim 2 wherein a double layer of the membrane is integrally secured to the support.

24. A composite structure comprising:
a support including a surface which is at least slightly soluble in a solvent; and
a membrane formed integrally to the surface of the support, the membrane comprising a resin soluble in the solvent and precipitated from a casting solution containing the resin and solvent while the casting solution is in contact with a substrate and the surface of the support, the membrane bonding to the support as the resin forms and the surface of the support reforms.

25. A composite structure comprising:
a support including a surface which is at least slightly soluble in a solvent; and
a membrane formed integrally to the surface of the support, the membrane comprising a resin soluble in the solvent and precipitated from a casting solution containing the resin and the solvent while the casting solution is in contact with a substrate and the surface of the support.

26. The composite structure of claim 25 wherein the composite structure is a filter structure and the support further comprises means for directing a fluid away from the surface of the support.

27. The filter structure of claim 26 wherein the surface of the support comprises a polymeric material.

28. The filter structure of claim 27 wherein the resin and the polymeric material of the support comprise the same polymer.

29. The filter structure of claim 26 wherein the polymeric material comprises a polyamide.

30. The filter structure of claim 26 wherein the polymeric material comprises PVDF.

31. The filter structure of claim 26 wherein the support has a generally flat configuration.

32. The filter structure of claim 26 wherein the support has a generally cylindrical configuration.

33. The filter structure of claim 26 wherein the support has a generally disc-like configuration.

34. The filter structure of claim 26 wherein the fluid directing means comprises at least one channel in the surface.

35. The filter structure of claim 26 wherein the fluid directing means comprises a porous region of the support which communicates with the surface.

36. The filter structure of claim 26 wherein the substrate comprises a fibrous sheet.

37. The porous structure of claim 36 wherein the fibrous sheet comprises polymeric fibers.

38. The filter structure of claim 37 wherein the polymeric fibers comprise polyester fibers.

39. The filter structure of claim 36 wherein the fibrous sheet comprises a non-woven web.

40. The filter structure of claim 26 wherein the resin comprises a polyamide.

41. The filter structure of claim 40 wherein the resin comprises nylon 46, 6, 66, 7, 69, 610, 612, 11, 12, or mixtures thereof.

42. The filter structure of claim 26 wherein the resin comprises polyvinylidene fluoride.

43. The filter structure of claim 26 wherein the resin comprises polyether sulfone.

44. The filter structure of claim 26 wherein the membrane is microporous.

45. The filter structure of claim 26 wherein the porosity of the membrane is in the ultrafiltration range and the membrane has the capability of retaining from solution molecules of molecular weight in the range from about 5000 to about 5 million Daltons.

46. The filter structure of claim 26 wherein the membrane is skinless.

47. The filter structure of claim 26 wherein a double layer of the membrane is integrally secured to the support.

48. The filter structure of claim 26 wherein the support is a netting of filaments in the form of a perforate support.

49. A method of making a composite structure comprising:
applying a casting solution containing a resin and a solvent for the resin to a substrate;
positioning the substrate on a surface of a support;
at least slightly dissolving the surface of the support by means of the solvent; and
forming a membrane integrally to the surface of the support by precipitating the resin from the casting solution while the solution is in contact with the substrate and the surface of the support, the membrane bonding to the support as the membrane forms and the surface of the support reforms.

50. The method of claim 49 further comprising the step of trimming excess casting solution from the substrate prior to positioning the porous substrate on a surface of the support.

51. The method of claim 50 wherein trimming excess casting solution comprises use of a doctor to remove excess casting solution from the substrate.

52. The method of claim 50 further comprising removing entrained gas from the immersed substrate.

53. The method of claim 49 wherein precipitating the resin includes immersing the support and impregnated substrate in a precipitating solution containing a non-solvent for the resin.

* * * * *